United States Patent
Rioux (10) Patent No.: US 10,018,066 B2
(45) Date of Patent: Jul. 10, 2018

(54) MINI BLIND STATOR LEAKAGE REDUCTION

(71) Applicant: United Technologies Corporation, Hartford, CT (US)

(72) Inventor: Philip Robert Rioux, North Berwick, ME (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 531 days.

(21) Appl. No.: 14/862,342

(22) Filed: Sep. 23, 2015

(65) Prior Publication Data

US 2016/0177766 A1  Jun. 23, 2016

Related U.S. Application Data (60) Provisional application No. 62/093,940, filed on Dec. 18, 2014.

(51) Int. Cl.
    *F01D 5/22* (2006.01)
    *F01D 11/00* (2006.01)
    (Continued)

(52) U.S. Cl.
    CPC .............. *F01D 11/008* (2013.01); *F01D 5/02* (2013.01); *F01D 5/225* (2013.01); *F01D 9/041* (2013.01); *F01D 11/005* (2013.01); *F05D 2220/32* (2013.01); *F05D 2240/11* (2013.01); *F05D 2240/55* (2013.01); *F05D 2240/80* (2013.01); *F05D 2250/182* (2013.01); *F05D 2250/183* (2013.01); *F05D 2250/184* (2013.01);
    (Continued)

(58) Field of Classification Search
    CPC . F01D 5/02; F01D 5/225; F01D 9/041; F01D 11/008; F01D 11/005; F05D 2220/32; F05D 2240/55; F05D 2240/80; F05D 2240/11; F05D 2250/182; F05D 2250/183; F05D 2250/184; F05D 2250/71; F05D 2250/75; Y02T 50/672
    See application file for complete search history.

(56) References Cited

U.S. PATENT DOCUMENTS 3,107,897 A * 10/1963 Judge .................... F01D 9/042
                                                   416/191
6,290,459 B1 * 9/2001 Correia .................. F01D 5/143
                                                   415/139

(Continued)

FOREIGN PATENT DOCUMENTS

| EP | 1724441 | 11/2006 |
|----|---------|---------|
| EP | 2808491 | 12/2014 |

OTHER PUBLICATIONS

Extended European Search Report dated Jun. 10, 2016 in European Application No. 15200715.9.

(Continued)

*Primary Examiner* — Igor Kershteyn
(74) *Attorney, Agent, or Firm* — Snell & Wilmer L.L.P.

(57) ABSTRACT

What is described is a partial platform. The partial platform includes a leading edge, a trailing edge, a first circumferential edge and a second circumferential edge. The first circumferential edge and the second circumferential edge are both swept such that a central circumferential axis forms a substantially rounded or squared S shape.

20 Claims, 7 Drawing Sheets

(51) Int. Cl.
*F01D 9/04* (2006.01)
*F01D 5/02* (2006.01)

(52) U.S. Cl.
CPC ...... *F05D 2250/71* (2013.01); *F05D 2250/75* (2013.01); *Y02T 50/672* (2013.01)

(56) References Cited

U.S. PATENT DOCUMENTS

| | | | |
|---|---|---|---|
| 7,270,518 B2* | 9/2007 | Barb | F01D 5/147 |
| | | | 416/191 |
| 2003/0044282 A1 | 3/2003 | Zhu et al. | |
| 2010/0040460 A1* | 2/2010 | Spangler | F01D 5/147 |
| | | | 415/191 |
| 2012/0051921 A1 | 3/2012 | Reno | |
| 2013/0004315 A1 | 1/2013 | Beeck et al. | |
| 2014/0037442 A1 | 2/2014 | Tatman et al. | |
| 2014/0079551 A1* | 3/2014 | Mori | F01D 5/225 |
| | | | 416/182 |

OTHER PUBLICATIONS

EP Office Action dated Jul. 26, 2017 in European Application No. 15200715.9.

* cited by examiner

MINI BLIND STATOR LEAKAGE REDUCTION

CROSS-REFERENCE TO RELATED APPLICATIONS

This application is a nonprovisional of, and claims priority to, and the benefit of U.S. Provisional Application No. 62/093,940, entitled "MINI BLIND STATOR LEAKAGE REDUCTION," filed on Dec. 18, 2014, which is hereby incorporated by reference in its entirety.

FIELD

The present disclosure relates generally to platforms for airfoils, and more particularly, to platforms encircling an axis of rotation in a gas turbine engine.

BACKGROUND

Gas turbine engines typically include multiple rows, or stages, of rotating blades and multiple stages of stators. The rotating blades rotate about an axis while the stators are fixed such that they do not rotate about the axis. Each stage of stators conditions a flow of fluid. Pressure is higher on one axial side of each stage of stators than the other axial side of each stage of stators. The stators have an inner diameter edge coupled to multiple platforms positioned circumferentially adjacent each other. Occasionally, fluid leaks from the higher pressure axial side of the stage of stators to the lower pressure axial side of the stage of stators by flowing through gaps between circumferentially adjacent platforms.

SUMMARY

The foregoing features and elements are be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a partial platform. The partial platform includes a leading edge, a trailing edge, a first circumferential edge and a second circumferential edge. The first circumferential edge and the second circumferential edge are both swept such that a central circumferential axis forms a substantially rounded or squared S shape.

Also described is a system for reducing an amount of leakage in a gas turbine engine. The system includes an airfoil and a partial platform of a segmented platform. The partial platform is coupled to the airfoil and configured to partially rotate in response to the airfoil becoming loaded. The partial platform includes a leading edge, a trailing edge, a first circumferential edge and a second circumferential edge. The first circumferential edge and the second circumferential edge are both swept such that a central circumferential axis forms a substantially rounded or squared S shape.

Also described is a system for reducing for reducing an amount of leakage in a gas turbine engine. The system includes a segmented platform encircling an axis of rotation of the gas turbine engine and including a plurality of partial platforms. Each of the partial platforms include a leading edge, a trailing edge, a first circumferential edge and a second circumferential edge. The first circumferential edge and the second circumferential edge are both swept such that a central circumferential axis forms a substantially rounded or squared S shape. The system also includes a plurality of airfoils coupled to the segmented platform.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION OF THE DISCLOSED EMBODIMENTS

Figure 1:
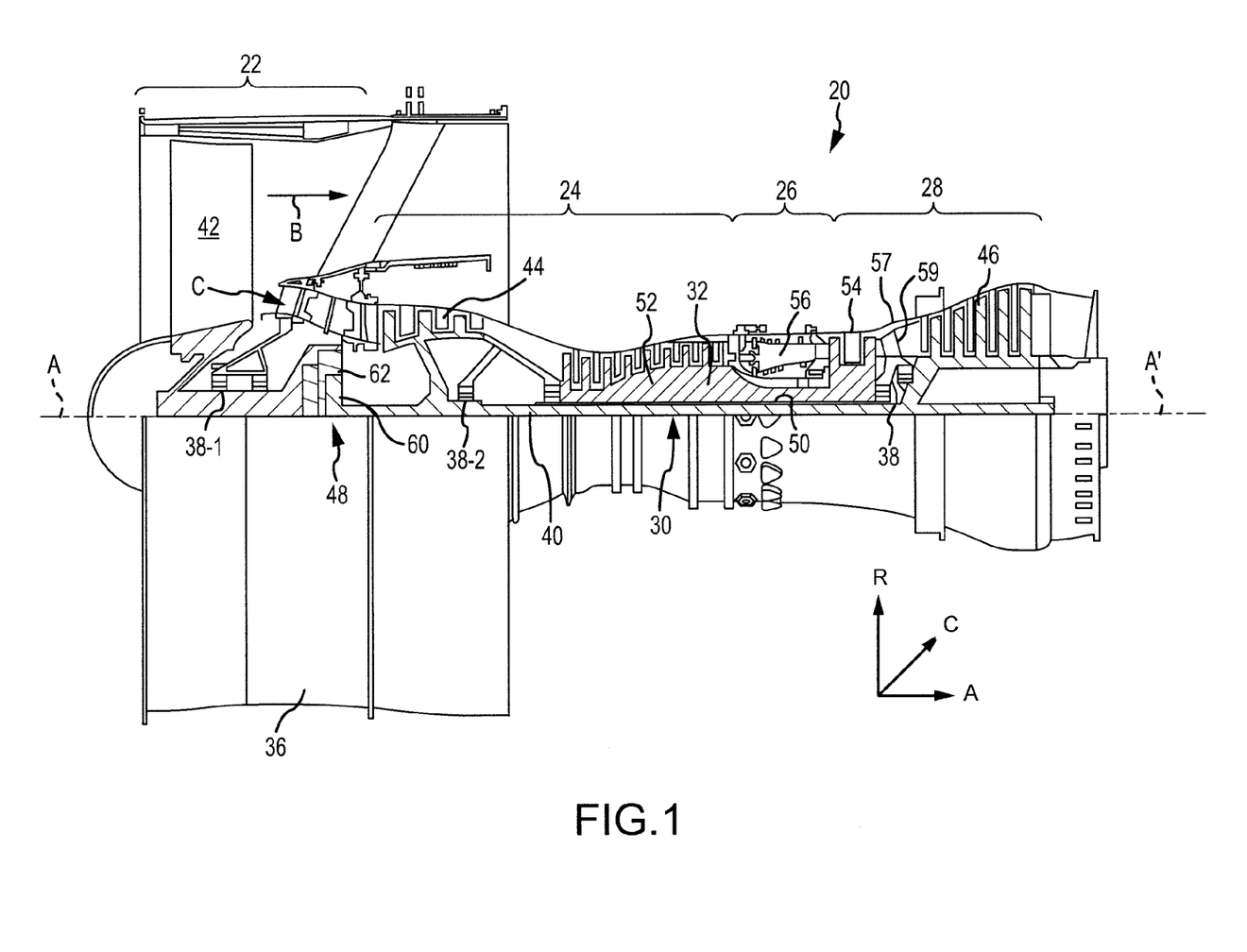
FIG. 1 is cross-sectional view of an exemplary gas turbine engine, in accordance with various embodiments.

With reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines include an augmentor section among other systems or features. In operation, fan section 22 drives coolant along a bypass flow-path B while compressor section 24 drives coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 generally includes an inner shaft 40 that interconnects a fan 42, a low pressure (or first) compressor section 44 and a low pressure (or first) turbine section 46. Inner shaft 40 is connected to fan 42 through a geared architecture 48 that can drive fan 42 at a lower speed than low speed spool 30. Geared architecture 48 includes a gear assembly 60 enclosed within a gear housing 62. Gear assembly 60 couples inner shaft 40 to a rotating fan structure. High speed spool 32 includes an outer shaft 50 that interconnects a high pressure (or second) compressor section 52 and high pressure (or second) turbine section 54. A combustor 56 is located between high pressure compressor 52 and high pressure turbine 54. A mid-turbine frame 57 of engine static structure 36 is located generally between high pressure turbine 54 and low pressure turbine 46. Mid-turbine frame 57 supports one or more bearing systems 38 in turbine section 28. Inner shaft 40 and outer shaft 50 are concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C is compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 is a high-bypass geared aircraft engine. The bypass ratio of gas turbine engine 20 may be greater than about six (6). The bypass ratio of gas turbine engine 20 may also be greater than ten (10). Geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). The bypass ratio of gas turbine engine 20 may be greater than about ten (10:1). The diameter of fan 42 may be significantly larger than that of the low pressure compressor section 44, and the low pressure turbine 46 may have a pressure ratio that is greater than about five (5:1). Low pressure turbine 46 pressure ratio is measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

The next generation of turbofan engines are designed for higher efficiency and use higher pressure ratios and higher temperatures in high pressure compressor 52 than are conventionally experienced. These higher operating temperatures and pressure ratios create operating environments that cause thermal loads that are higher than the thermal loads conventionally experienced, which occasionally shortens the operational life of current components.

Figure 2:
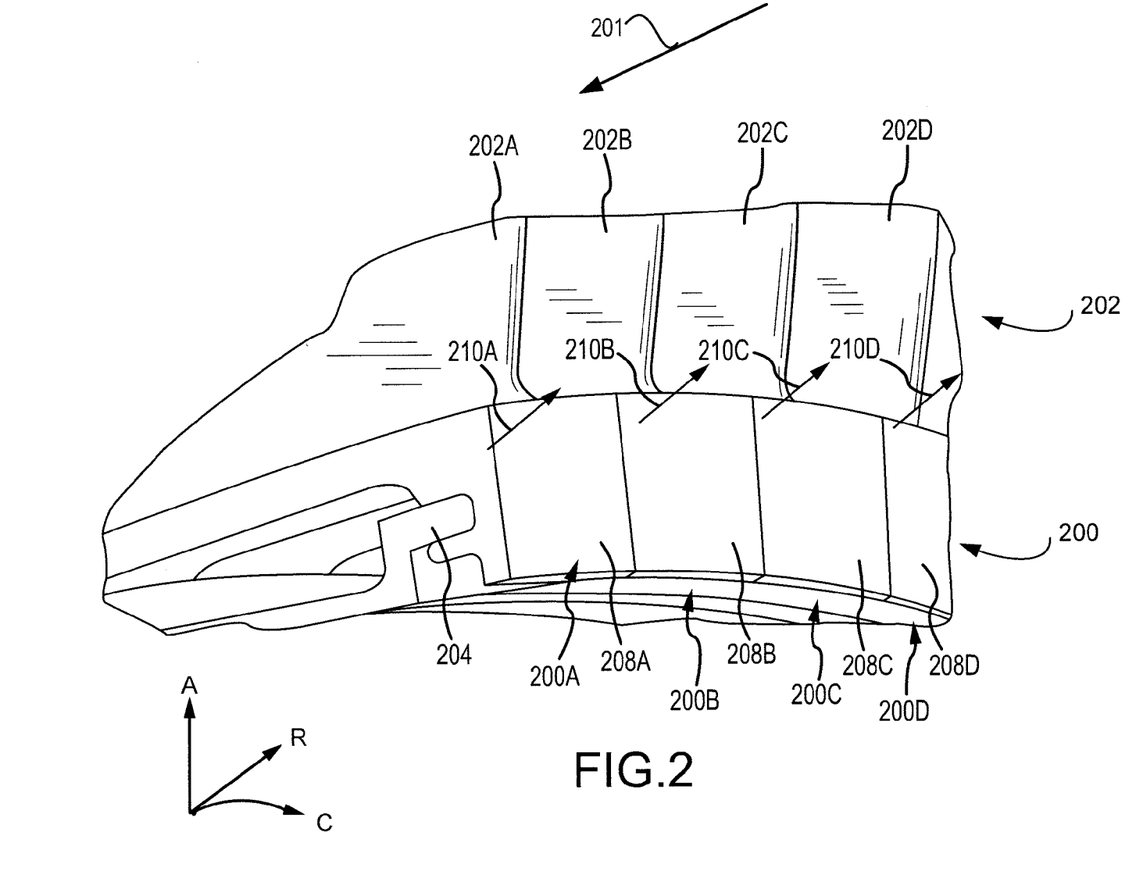
FIG. 2 illustrates a three dimensional view of a portion of the gas turbine engine of FIG. 1, in accordance with various embodiments.

FIG. 2 illustrates a three dimensional view of a portion of gas turbine engine 20. A C-R-A axis is illustrated to show the circumferential, radial and axial directions. In FIG. 2, four airfoils 202 are coupled to four platform 200. Airfoils 202 may be stators or vanes. Platforms 200 are positioned circumferentially adjacent each other, such that platform 200A is positioned circumferentially adjacent platform 200B, etc. Platform 200A may contact platform 200B. A number of platforms are positioned circumferentially adjacent such that the number of platforms encircles the axis of rotation of gas turbine engine 20. As such, the number of platforms is considered a segmented platform, such that each of the platforms 200 is considered a partial platform.

Each platform is coupled to an airfoil. For example, platform 200A is coupled to airfoil 202A. Platforms 200 are positioned radially inward from airfoils 202. As such, platforms 200 are inner diameter platforms of airfoils 202. Features and advantages described herein are directed to inner diameter platforms, however, the same features and advantages may be implemented and recognized with respect to outer diameter and other platforms.

Platforms 200 are not be fixedly attached to one another. This allows platform 200A to move relative to platform 200B. Platforms 200 are coupled together via an inner diameter shroud 204. Inner diameter shroud 204 causes platforms 200 to remain in substantially the same relative position axially, radially and circumferentially and causes airfoils 202 to remain positioned against a honeycomb seal.

The portion of gas turbine engine 20 illustrated in FIG. 2 is within high pressure compressor 52 of gas turbine engine 20. However, the components illustrated in FIG. 2 may also be utilized in low pressure compressor 44, high pressure turbine 54, low pressure turbine 46 or the like.

During operation of gas turbine engine 20, a gas path 201 is formed. Gas path 201 flows aftward, as shown. In response to gas turbine engine being operational, an aft side of airfoils 202, i.e., a side proximate the positive R axis, has a higher pressure than a forward side of airfoils 202 because in a turbine section, a forward side may experience more pressure than an aft side. Because platforms 200 are not directly affixed together, gaps occur between each of the platforms 200. Because of the gaps and the pressure differential, leakage occurs between each of the platforms 200. For example, arrow 210B indicates leakage air that flows between platform 200A and platform 200B. Arrow 210A, arrow 210C and arrow 210 D illustrate similar leakage air.

Figure 3A:
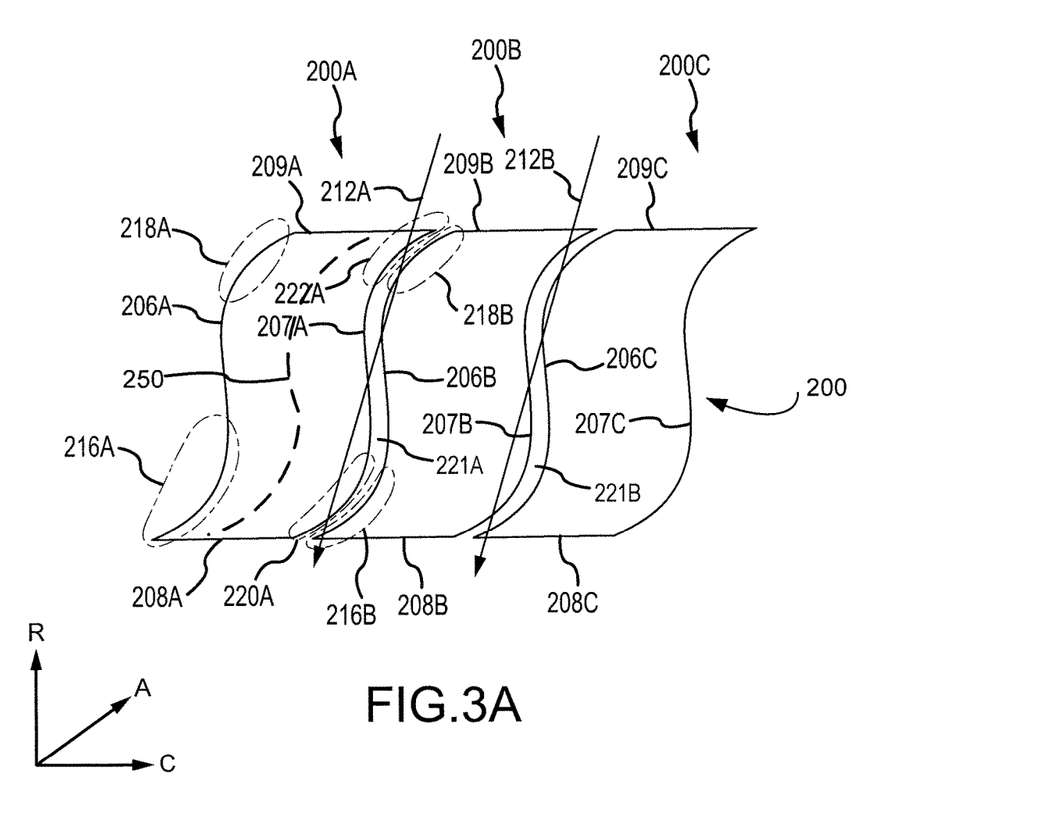
FIG. 3A illustrates a radially inward view of platforms including swept circumferential edges, in accordance with various embodiments.

With reference to FIG. 3A, a radially inward view of platforms 200 is illustrated. Platform 200A includes a leading edge 208A, a trailing edge 209A, a first circumferential edge 206A and a second circumferential edge 207A. As previously discussed with reference to FIG. 2, platforms 200 are not fixedly attached together, such that platform 200A shifts relative to platform 200B. Platform 200A and platform 200B are separated by a gap 221A.

With reference back to FIG. 2, in response to airfoils 202 becoming loaded, i.e., subject to a flow of air in the direction of gas path 201, platforms 200 partially rotate about a radial axis, such as axis R. Platforms 200 rotate less than 90 degrees about the R axis. Returning to FIG. 3A, platforms 200 include a sweep at opposing circumferential edges that is either rounded or squared for reducing air leakage within gaps 221 when airfoils 202 become loaded.

On platform 200A, first circumferential edge 206A is swept in the same manner as second circumferential edge 207A, such that first circumferential edge 206A is identical to second circumferential edge 207A. A central circumferential axis 250 of platform 200A between first circumferential edge 206A and second circumferential edge 207A, as well as first circumferential edge 206A and second circumferential edge 207A, forms a substantially rounded or squared S shape. Because platforms rotate in response to airfoils 202 becoming loaded, the swept circumferential edges reduce the size of gaps 221 between airfoils 202, thus reducing the amount of leakage fluid flowing between airfoils 202.

Figure 5A:
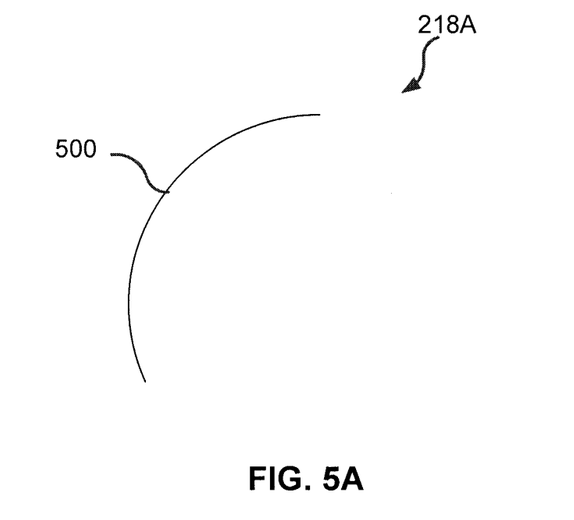
FIG. 5A illustrates a rounded chevron, in accordance with various embodiments.
Figure 5B:
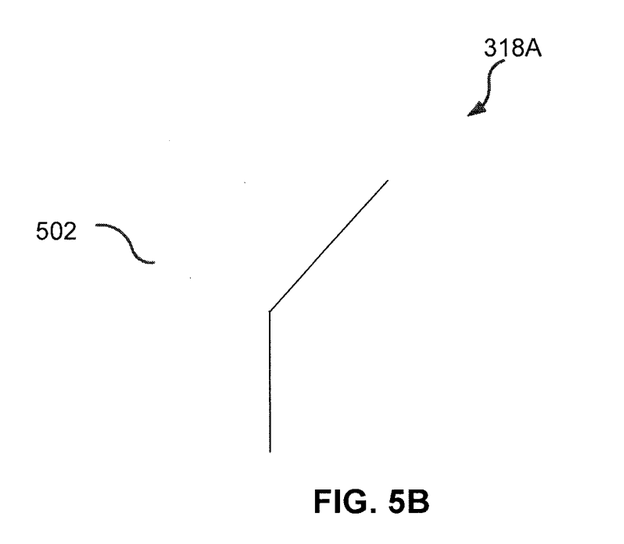
FIG. 5B illustrates an angled chevron, in accordance with various embodiments.

Platform 200A includes a partial swept edge 218A of first circumferential edge 206A near trailing edge 209A. Partial swept edge 218A is considered outward as an apex of partial swept edge 218A extends away from a center of platform 200A. Platform 200A also includes a partial swept edge 216A of first circumferential edge 206A near leading edge 208A. Partial swept edge 216A is considered inward as an apex of partial swept edge 216A extends towards a center of platform 200A. Platform 200A also includes a partial swept edge 222A of second circumferential edge 207A near trailing edge 209A and a partial swept edge 220A of second circumferential edge 207A near leading edge 208A. Platform 200B and platform 200C include similar swept edges as platform 200A. The partial swept edges may be chevrons, as illustrated in FIGS. 5A and 5B.

The swept edges defined by platform 200A are rounded, as the apexes do not include angles. The swept edges may also be angled or a combination of angled and rounded, such that some partial swept edges are rounded and others are angled.

Figure 3B:
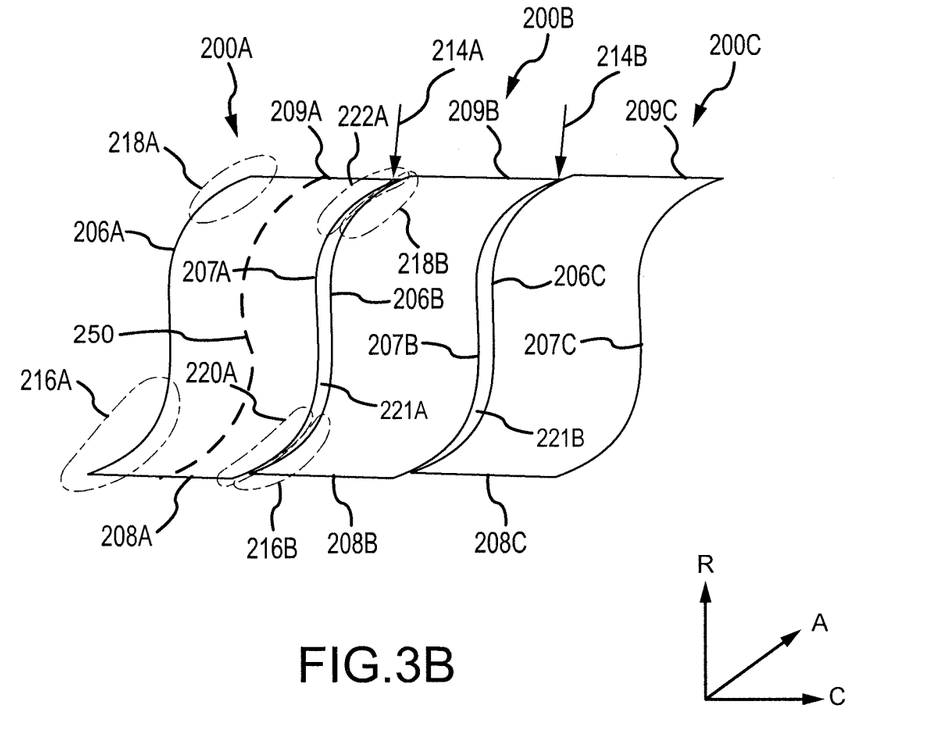
FIG. 3B illustrates the platforms of FIG. 3A in a rotated position relative to FIG. 3A, in accordance with various embodiments.

The inclusion of swept edges reduces air leakage within gaps 221. FIG. 3B illustrates platforms 200 in a rotated position relative to FIG. 3A. Platforms 200 rotate in a clockwise direction as viewed radially inward about a radial axis, such as axis R, such that trailing edges 209 rotate towards the positive C direction. Selection of the direction of sweep is based on whether the quadrant of platform 200A will be rotating towards or away from an adjacent platform. For example, partial swept edge 222A will rotate towards platform 200B, so it is desirable for partial swept edge 222A to be inward. Similarly, partial swept edge 220A will rotate away from platform 200B. Thus, it is desirable for partial swept edge 220A to be outward. In embodiments in which platforms 200 rotate counterclockwise as viewed radially inward, it may be desirable for partial swept edge 216A and partial swept edge 222A to be outward swept edges and for partial swept edge 218A and partial swept edge 220A to be inward. The design of the swept circumferential edges is partially based on considerations other than direction of rotation.

As a result of the rotation of platforms 200, partial swept edge 222A of platform 200A will approach and contact partial swept edge 218B of platform 200B. Similarly, partial swept edge 216B of platform 200B will approach and contact partial swept edge 220A of platform 200A. Arrow 214A illustrates a leakage path of air between platforms 200. In response to partial swept edge 222A approaching partial swept edge 218B and partial swept edge 216B approaching partial swept edge 220A, the amount of leakage flowing within gap 221A is reduced.

As the pressures around airfoils 202 increases in response to gas path 201, the potential for fluid leakage increases. However, as loading on airfoils 202 increases, the rotational force applied to platforms 200 also increases, forcing partial swept edge 222A and partial swept edge 218B together with more force. Therefore, as the potential for leakage increases between platforms 200 due to higher air pressure, platforms 200 are pushed together with more force, reducing a potential amount of leakage.

Platforms 200 comprise a metal, such as stainless steel, an austenitic nickel-chromium-based alloy such as Inconel™ which is available from Special Metals Corporation of New Hartford, N.Y., USA, titanium, composite materials, and other suitable materials. Platforms 200 may be manufactured using metal laser sintering, casting, an additive manufacturing process, stamping sheet metal or the like.

Figure 4A:
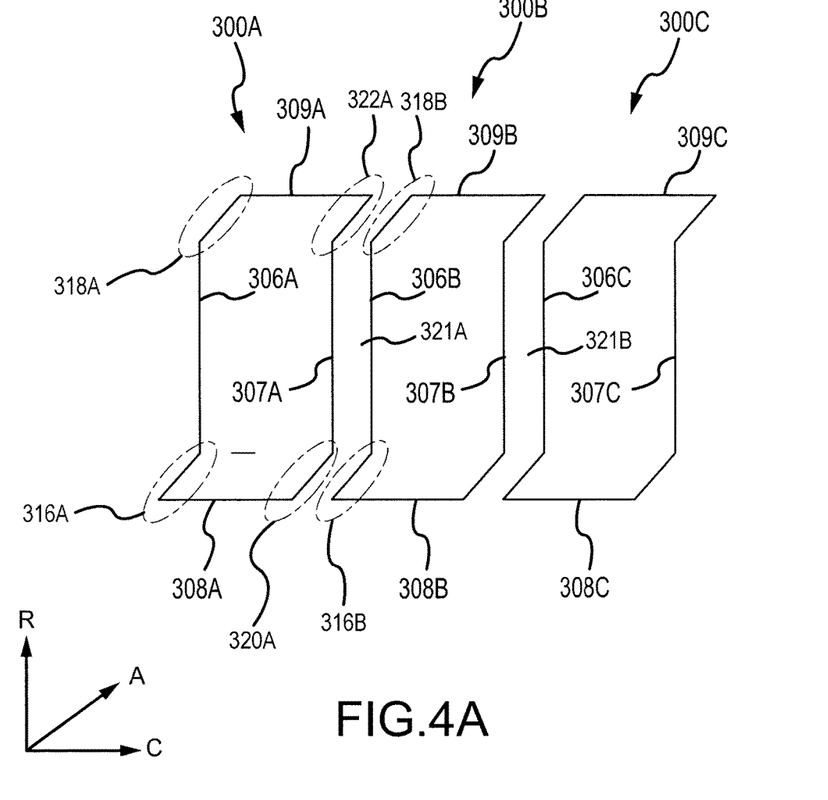
FIG. 4A illustrates a radially-inward view of three platforms that include squared swept circumferential edges, in accordance with various embodiments.

First circumferential edge 306A and second circumferential edge 307A are both swept such that they each appear as a squared S shape. The swept edges on platforms of a gas turbine engine may be angled instead of rounded. FIG. 4A illustrates a radially-inward view of three platforms 300 that include angled swept edges. A platform 300A includes a partial swept edge 318A of first circumferential edge 306A near a trailing edge 309A, a partial swept edge 316A of first circumferential edge 306A near a leading edge 308A, a partial swept edge 322A of second circumferential edge 307A near trailing edge 309A and a partial swept edge 320A of second circumferential edge 307A near leading edge 308A. Platform 300B and platform 300C include similar features as platform 300A.

While each platform disclosed herein includes circumferential edges that are swept at the leading edges and trailing edges, platforms may be designed such that the circumferential edges are only swept at the leading edge or the trailing edge.

Figure 4B:
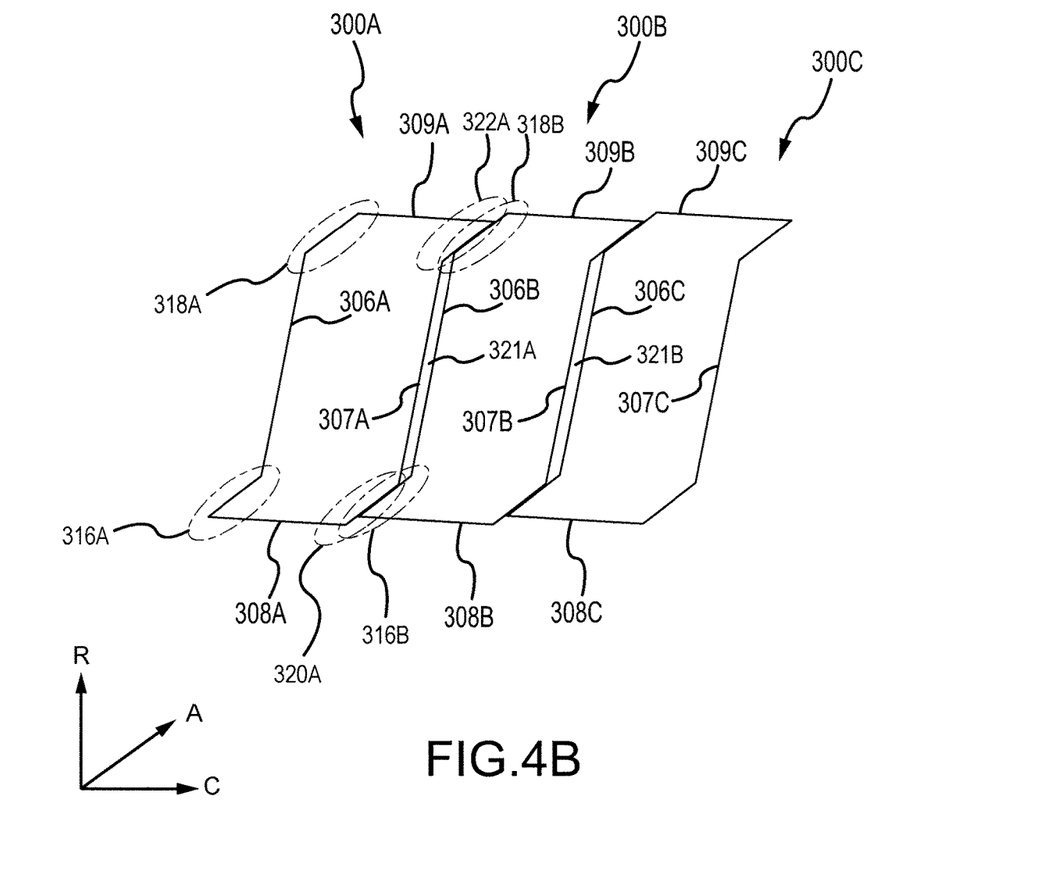
FIG. 4B illustrates the platforms of FIG. 4A in a loaded configuration, in accordance with various embodiments.

FIG. 4B illustrates platforms 300 of FIG. 4A in a loaded configuration. In response to airfoils coupled to platforms 300 being loaded, platforms 300 rotate about a radial axis such as axis R. In response, partial swept edge 322A approaches partial swept edge 318B. Partial swept edge 322A contacts partial swept edge 318B. When partial swept edge 322A approaches partial swept edge 318B, an amount of leakage air flowing through gap 321A is reduced.

The incorporation of swept circumferential edges into platforms 300 reduces a total amount of leakage air between stages of a compressor or turbine of gas turbine engine 20. This in turn increases the efficiency of gas turbine engine 20.

When platforms 200 or platforms 300 include chevrons, the chevrons may be rounded or angles. FIG. 5A illustrates partial swept edge 218A as a rounded chevron and FIG. 5B illustrates partial swept edge 318A as an angled chevron. Partial swept edge 218A does not include angles and has an apex 500. Partial swept edge 318A includes an angle and an apex 502.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments are realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like includes permanent, removable, temporary, partial, full and/or any other possible attachment option. Additionally, any reference to without contact (or similar phrases) also includes reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Benefits, other advantages, and solutions to problems have been described herein with regard to specific embodiments. The scope of the disclosure, however, is provided in the appended claims.

The invention claimed is:

1. A partial platform, the partial platform comprising:
   a leading edge;

a trailing edge;
a first circumferential edge; and
a second circumferential edge wherein the first circumferential edge and the second circumferential edge are both partially swept such that a central circumferential axis forms a substantially rounded or squared S shape.

2. The partial platform of claim 1, wherein the first circumferential edge includes a first partial swept edge near the leading edge that is outward and the second circumferential edge includes a second partial swept edge that is inward.

3. The partial platform of claim 2, wherein the first circumferential edge includes a third partial swept edge near the trailing edge that is inward and the second circumferential edge includes a fourth partial swept edge near the trailing edge that is outward.

4. The partial platform of claim 1, wherein the central circumferential axis forms a substantially rounded S shape.

5. The partial platform of claim 1, wherein the central circumferential axis forms a substantially squared S shape.

6. The partial platform of claim 1, wherein the partial platform is part of an inner diameter platform.

7. The partial platform of claim 1, wherein the partial platform is configured to be utilized in a high pressure compressor section of a gas turbine engine.

8. A system for reducing an amount of leakage in a gas turbine engine, the system comprising:
an airfoil; and
a partial platform of a segmented platform, the partial platform being coupled to the airfoil, configured to partially rotate in response to the airfoil becoming loaded and including:
a leading edge;
a trailing edge;
a first circumferential edge; and
a second circumferential edge wherein the first circumferential edge and the second circumferential edge are both partially swept such that a central circumferential axis forms a substantially rounded or squared S shape.

9. The system of claim 8, wherein the first circumferential edge includes a first partial swept edge near the leading edge that is outward and the second circumferential edge includes a second partial swept edge that is inward.

10. The system of claim 9, wherein the first circumferential edge includes a third partial swept edge near the trailing edge that is inward and the second circumferential edge includes a fourth partial swept edge near the trailing edge that is outward.

11. The system of claim 8, wherein the central circumferential axis forms a substantially rounded S shape.

12. The system of claim 8, wherein the central circumferential axis forms a substantially squared S shape.

13. The system of claim 8, wherein the segmented platform is an inner diameter platform.

14. The system of claim 8, wherein the system is configured to be utilized in a high pressure compressor section of the gas turbine engine.

15. A system for reducing for reducing an amount of leakage in a gas turbine engine, the system comprising:
a segmented platform encircling an axis of rotation of the gas turbine engine and including a plurality of partial platforms, each of the plurality of partial platforms including:
a leading edge;
a trailing edge;
a first partially swept circumferential edge; and
a second partially swept circumferential edge such that a central circumferential axis forms a substantially rounded or squared S shape; and
a plurality of airfoils coupled to the segmented platform.

16. The system of claim 15, wherein the first swept circumferential edge includes a first partial swept edge near the leading edge that is outward and the second swept circumferential edge includes a second partial swept edge that is inward.

17. The system of claim 15, wherein the first swept circumferential edge includes a third partial swept edge near the trailing edge that is inward and the second swept circumferential edge includes a fourth partial swept edge near the trailing edge that is outward.

18. The system of claim 15, wherein the central circumferential axis forms a substantially rounded S shape.

19. The system of claim 15, wherein the central circumferential axis forms a substantially squared S shape.

20. The system of claim 15, wherein the segmented platform is an inner diameter platform.

* * * * *